United States Patent [19]

Martin

[11] Patent Number: 4,577,747
[45] Date of Patent: Mar. 25, 1986

[54] CONVEYOR ROLLER AND BEARING ASSEMBLY

[75] Inventor: Donald E. Martin, Waukesha, Wis.

[73] Assignee: Rexnord Inc., Brookfield, Wis.

[21] Appl. No.: 706,698

[22] Filed: Feb. 28, 1985

[51] Int. Cl.$^4$ ............................................. B65G 45/02
[52] U.S. Cl. ................................... 198/500; 198/780; 384/222; 384/220; 384/398; 29/116 R; 193/37
[58] Field of Search ............... 198/781, 842, 500, 780, 198/789, 790; 384/320, 220, 222, 398; 193/37; 184/12; 29/110, 116 R

[56] References Cited

U.S. PATENT DOCUMENTS

| | | | |
|---|---|---|---|
| 3,110,526 | 11/1963 | Sternlicht | 384/222 |
| 3,149,819 | 9/1964 | Baumann et al. | 384/220 |
| 3,815,196 | 6/1974 | Gotham et al. | 29/116 R |
| 3,994,380 | 11/1976 | Hope et al. | 198/780 |
| 4,047,772 | 9/1977 | Goloff | 384/222 |
| 4,325,474 | 4/1982 | Rae | 198/781 |
| 4,441,601 | 4/1984 | Rood | 193/37 |
| 4,467,509 | 8/1984 | Dezen | 29/116 R |

Primary Examiner—Joseph E. Valenza
Assistant Examiner—Kyle E. Shane
Attorney, Agent, or Firm—William L. Falk

[57] ABSTRACT

A conveyor roller and bearing arrangement rotatable about a fixed axle lying between spaced side frame rails includes a pair of self-aligning bearing assemblies in each end of the roller. Each bearing assembly includes an inner bearing race fixed to the axle, an outer bearing race rotatably mounted on the inner bearing race and an outer cushioning sleeve secured to the roller and outer bearing race for maintaining axial alignment between the inner and outer bearing races.

13 Claims, 7 Drawing Figures

CONVEYOR ROLLER AND BEARING ASSEMBLY

BACKGROUND OF THE INVENTION

The present invention relates to conveyor rollers of the type which rotate on fixed axles and have internally mounted bearings at each end, and more particularly relates to conveyor rollers suitable for use where dust and moisture create a corrosive environment, yet conveyor cleanliness is of prime concern.

Examples of applications for the aforementioned type of conveyor rollers include food and beverage handling facilities. In such applications, under normal operating conditions, each roller is subjected to periodic loading and subsequent axle misalignment as a package travels across a conveyor. However, during periods of increased production, each roller may be subjected to higher speeds and almost continual load and axle misalignment.

Conventional conveyor rollers utilize metallic journal bearings, sleeve bearings, or antifriction bearings such as ball bearings which are subject to misalignment or a loss of bearing surface contact when the roller axle deflects under heavy and/or impact loads. Bearings may "walk" or move within the roller under these overload conditions. In the case of ball bearings, a deflection of the roller axle of only $1\frac{1}{2}°$ causes the individual balls to become pinched between the inner and outer races. This additional load on the bearing causes a significant increase in friction as well as a corresponding increase in roller temperature. Conveyor roller bearings deteriorate much faster during extended periods of this type of axle deflection. An additional problem occurs when using powered or driven rollers having grooves in which the drive belts ride. Forming these grooves may overstress the rollers and can undesirably preload the bearing when it is inserted in the end of the roller. Other preloading may result due to the manufacturing of the inner roller surface. Such preloading accelerates friction, wear and lockup of the bearing.

An additional drawback of conventional conveyor rollers is the clattering din they produce during periods of peak production which is quite objectionable. Increased legislative regulation of worker health and safety has given the goal of eliminating excessive noise.

Rollers have been constructed with polymeric material, however, the mere substitution of polymers for conventional metallic rollers and bearings has generated new difficulties, such as the inability of polymeric bearings to withstand insulative heat generated by friction produced during roller operation. Such heat buildup can accelerate friction, wear and lockup of the bearing.

Thus, there is a definite need for a conveyor roller and bearing arrangement capable of low friction operation which cushions and absorbs roller and axle misalignment and keeps rolling friction losses to a minimum. There is also a need for a conveyor roller and bearing arrangement which compensates for normal manufacturing tolerances of the inner surface of the roller in order to avoid preloading the bearing excessively.

It is therefore a major objective of the present invention to provide a conveyor roller designed to rotate on a fixed axle and having internally mounted bearings capable of accepting the maximum of normally encountered axle misalignment without suffering a loss in bearing surface contact and a concomitant increase in friction.

Another objective of the present invention is to provide a conveyor roller bearing designed to generate a minimum amount of excess heat and to readily dissipate whatever amount of heat is generated.

A still further objective of the present invention is to provide a conveyor roller which generates a minimum of operational noise.

Another objective of the present invention is to provide a conveyor roller which is self-lubricated.

SUMMARY OF THE INVENTION

The present invention discloses a conveyor roller designed to rotate on a stationary axle by means of internally mounted bearings located and mounted at each end of the roller and secured by a friction fit. The bearings are designed to cushion and absorb shock loading and preloading and maintain optimum surface contact between inner and outer races of the bearing. The present invention further discloses a conveyor roller having self-lubricating, heat dissipating and substantially silent-running properties, and which is designed to be readily mounted in a conveyor frame.

The conveyor roller and bearing arrangement of the present convention comprises a hollow, cylindrical roller, having two open ends into which a pair of bearing assemblies are mounted. Each bearing assembly has a hollow inner bearing race which surrounds and is keyed to the axle to prevent rotation but permit sliding movement of the inner bearing race on the axle. A hollow outer bearing race is rotatably mounted on the inner bearing race and has a flanged portion provided with cooling fins designed to dissipate heat in the live area of bearing contact. A hollow outer cushioning sleeve is secured in the end of the roller and to the outer bearing race so that the roller, outer bearing race and outer cushioning sleeve will freely turn on the inner bearing race which is fixed to the stationary axle.

It is desirable to optimize the surface contact between the inner and outer bearing races in the presence of heavy loading. Unlike the prior art, the present invention accomplishes this by designing the material and structure of the outer cushioning sleeve to be deformable upon application of forces subjected axially and radially of the roller or axle.

The cooperating geometry of the outer bearing race and outer cushioning sleeve further provides for a self-lubricating device. More particularly, a reservoir formed by ribs on the outer bearing race and passageways on the outer cushioning sleeve, communicates with channels on the outer cushioning sleeve to deliver lubricant to the live bearing surface between inner and outer bearing races.

By utilizing low friction polymeric materials for the inner and outer bearing races and outer cushioning sleeve, a quiet, high strength, low friction arrangement can be supplied.

BRIEF DESCRIPTION OF THE DRAWINGS

The invention and its many attendant objects and advantages will become better understood by reference to the following detailed description of the preferred embodiment when read in conjunction with the following drawings wherein.

DETAILED DESCRIPTION OF THE PREFERRED EMBODIMENT

Figure 1:
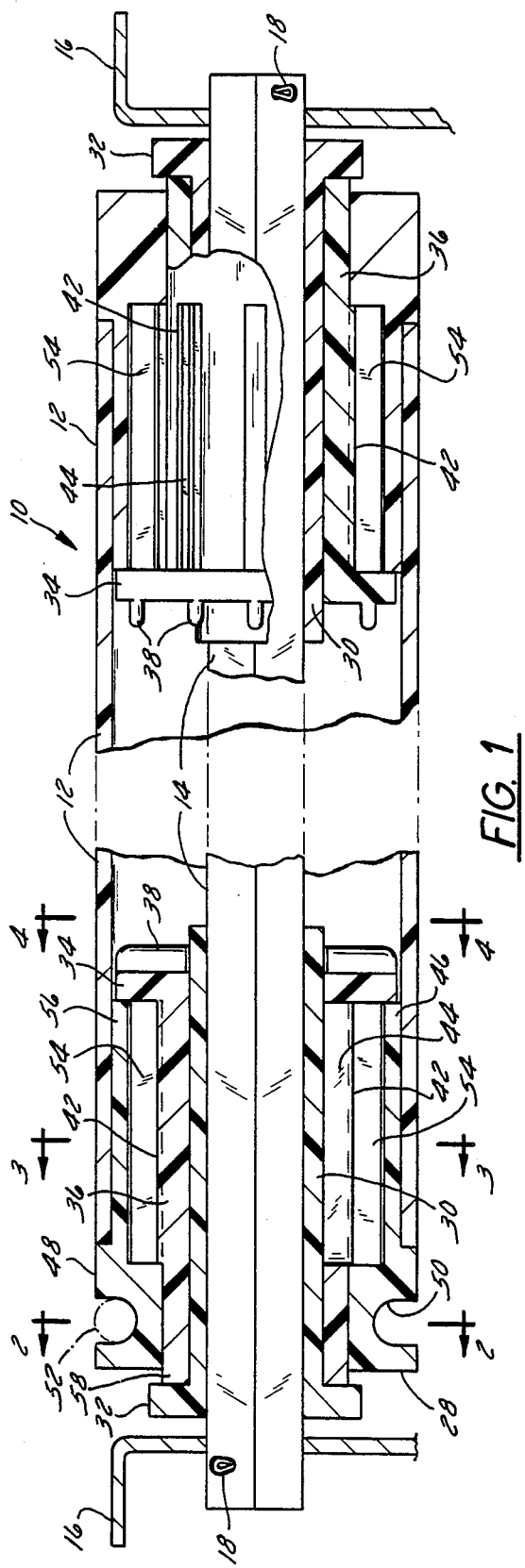
FIG. 1 is a section elevation of the conveyor roller and bearing arrangement of the present invention.
Figure 4:
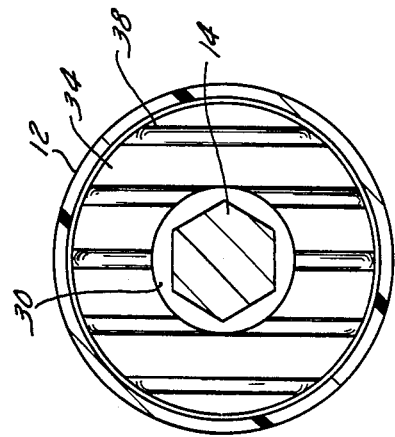
FIG. 4 is a cross sectional view of the arrangement taken on line 4—4 of FIG. 1.
Figure 6:
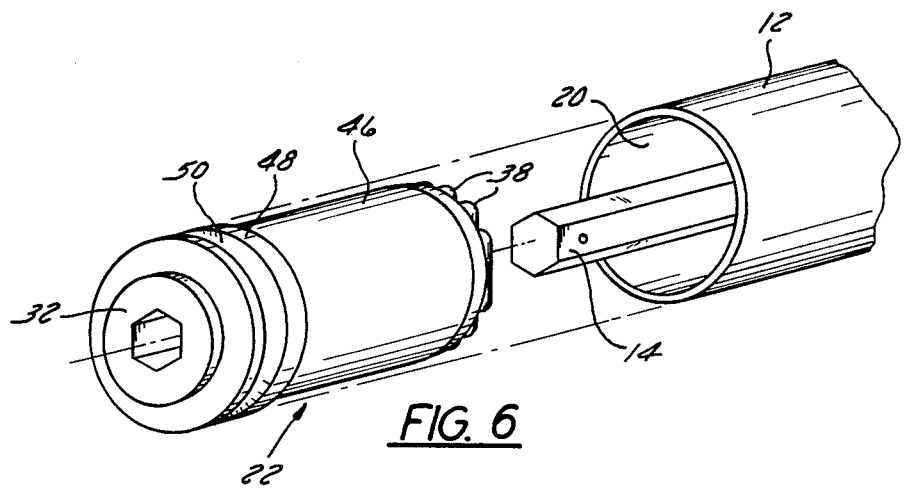
FIG. 6 is an exploded perspective view of the bearing assembly, axle and roller shown in the arrangement of FIG. 1.
Figure 7:
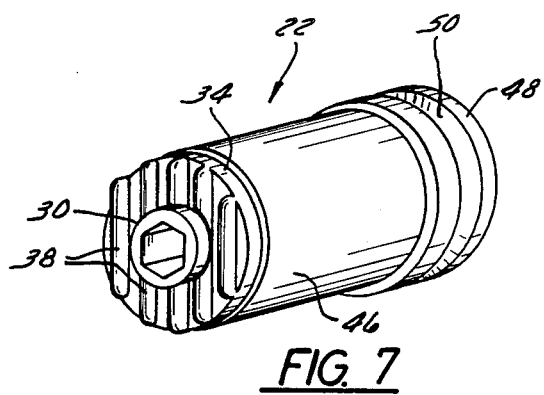
FIG. 7 is a reverse perspective view of the bearing assembly shown in FIG. 6.

Referring now to the drawings wherein like reference characters designate identical or corresponding parts, a conveyor roller and bearing arrangement 10 is best introduced through FIGS. 1 and 6, which illustrate a hollow, cylindrical, preferably metallic, roller 12 adapted for rotary movement about a stationary hexagonal axle 14. The axle 14 is fixed between spaced side support frame rails 16 by cotter pins 18 and prevented from rotation by a key fit within the rails 16. To allow free rotation of the roller 12 with respect to the axle 14, both open ends 20 of the roller 12 are fitted with a plastic bearing assembly 22.

Each of the bearing assemblies 22 includes three hollow pieces, namely, an inner bearing race 24, and outer bearing race 26 and an outer cushioning sleeve 28. The inner bearing race 24 has a cylindrical portion 30 joined to an annular flange 32, and surrounds and is slidably keyed to the stationary axle 14. The outer bearing race 26 is constructed with an annular flange 34 and a cylindrical portion 36, the inner surface of which is adapted for rotation to provide a low friction running fit on the cylindrical portion 30 of the inner bearing race 24. Formed on the face of the flange 34 is a plurality of outwardly projecting cooling fins 38 designed to conduct heat generated by the inherent friction produced by operation of the conveyor roller away from the bearing assembly for radiated dissipation through the roller 12. In order to provide engagement with the outer cushioning sleeve 28, the outer surface of the cylindrical portion 36 is provided with a series of axially extending, circumferentially spaced ribs 42 having side walls diverging outwardly from the surface 36. Certain of these ribs 42 are cut with a channel 44 for delivering lubricant between the inner and outer bearing races 24, 26, as will be described later.

The composition of races 24, 26 may be of any number of suitable materials but preferably should be similar polymeric materials exhibiting a high surface hardness for low wear, low friction levels to keep heat at a minimum, high load bearing capacity and high sheer strength.

Figure 3:
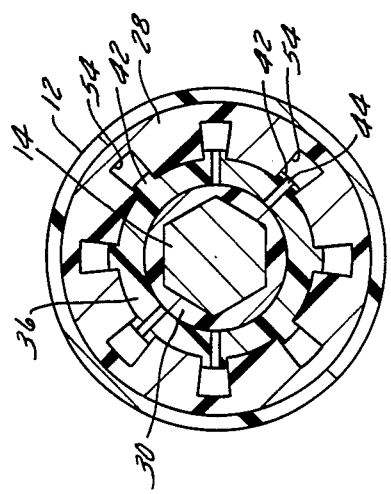
FIG. 3 is a cross sectional view of the arrangement taken on line 3—3 of FIG. 1.
Figure 2:
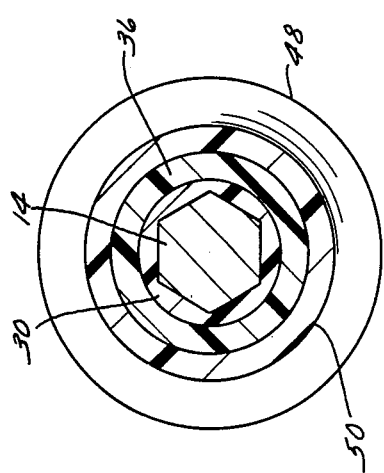
FIG. 2 is a cross sectional view of the arrangement taken on line 2—2 of FIG. 1.
Figure 5:
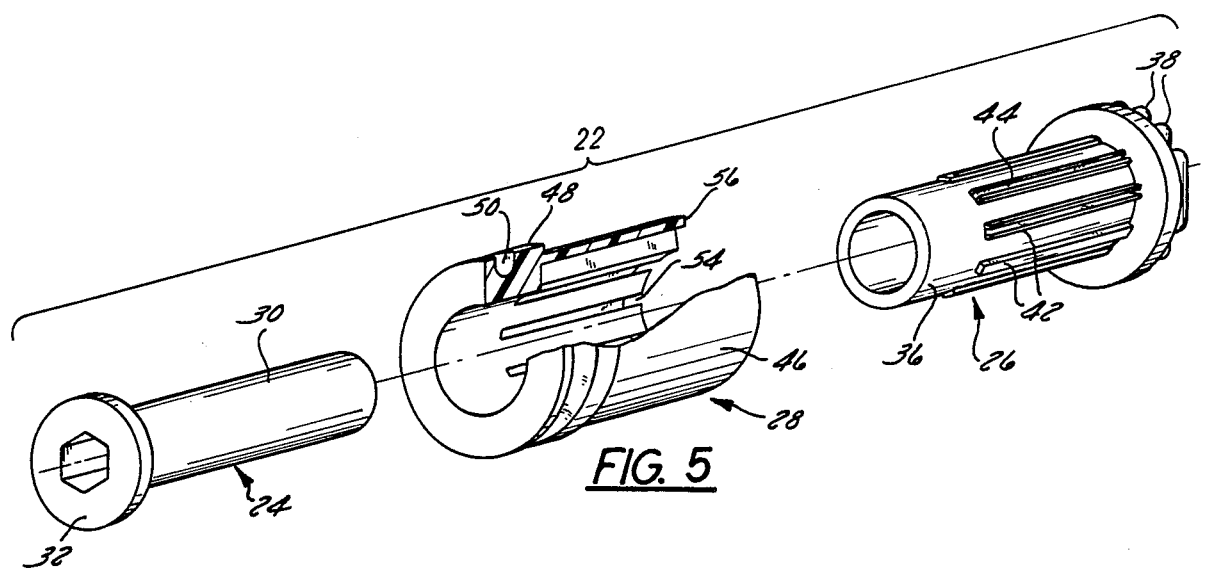
FIG. 5 is an exploded perspective view of the bearing assembly shown in the arrangement of FIG. 1.

Turning now to the construction of outer cushioning sleeve 28, the exterior surface 46 is generally cylindrical and designed to be press fitted into the open end 20 of the roller 12. For driven or powered roller applications, sleeve 28 has an enlarged collar 48 into which is preferably formed a groove 50 adapted to be engaged by a belt or O-ring 52 driven by a motor (not shown). Alternately, the collar 48 could be fashioned as a two piece sprocket assembly to be driven by a chain. Obviously, the groove or sprocket would not be necessary on gravity type rollers. As best seen in FIGS. 3 and 5, the sleeve 28 is structured internally with a series of axially extending, circumferentially spaced passageways 54, having side walls which are outwardly divergent toward and an end wall generally parallel to the exterior surface 46. The side walls of the passageways 54 are sized for press fit, frictional engagement with the complementary side walls of ribs 42 on outer bearing race 26. More specifically, during assembly, the ribs 42 of outer bearing race 26 are axially slidable into the lower side wall portions of the passageways 54 of outer sleeve 28 until engagement of the flange 34 with the end 56 of the sleeve 28 occurs. Since the sleeve 28 is connected to outer bearing race 26 and is fit into the roller, the sleeve 28, outer bearing race 26 and roller 12 will all rotate freely upon the inner bearing race 24 which is keyed to the stationary axle 14. In assembled form, the arrangement provides communication between the inner and outer bearing race surfaces and certain of the passageways 54 aligned with the channels 44. As a feature of the invention, certain of these passageways 54 cooperate at one end with the collar 48 and at the other end with flange 34 to provide reservoirs for holding lubricant which when heated due to elevated bearing temperatures from increased loading will flow with changed viscosity through channels 44 to the interface of races 24, 26 and thereby maintain the sliding friction losses low.

As a distinct advantage of the present invention, the sleeve 28 is made of polymeric material different from that of races 24, 26 in possessing a softness which will allow limited deformation or "cushioning" of the sleeve portions or lands forming the end and side walls of the passageways 54 when the roller 12 is subjected to either impact loading forces or preload forces due to manufacturing tolerances of the inner surface of the roller. Otherwise stated, the material, shape and geometry of this cushioning arrangement enables proper axial alignment of the inner and outer bearing races 24, 26 even when the axle 14 and roller 12 are dynamically or statically loaded.

In assembly, outer bearing race 26 and outer cushioning sleeve 28 are slidably engaged to bring end 56 slightly apart from flange 34 so that lubricant can be shot in the channels 44. The outer bearing race 26 and sleeve 28 are then quickly closed together and the inner bearing race 24 is inserted through the race-sleeve unit 26, 28. The three piece bearing assembly 22 is then keyed onto axle 14 and press fit into each end 20 of the roller 12 after which the axle 14 can be secured to the rails 16.

The arrangement as assembled allows the inner bearing race 24 a limited degree of free axial movement on the axle 14 to ensure the bearing assemblies 22 are not loaded axially one relative to the other. In FIG. 1, the annular flange 32 has a limited outward travel defined by engagement with the frame rail 16 and limited inward travel is defined by engagement of the flange 32 with the mouth 58 of the fixed outer bearing race 26. It should be noted however that even in its outermost position, the inner race 24 is designed with a length on its cylindrical portion 30 which will allow for continuous contact with the axial of outer race 26. Additionally, the outer diameter of the annular flange 34 is less than the inner diameter of the roller 12 so as to prevent jamming of the bearing assembly 22.

Thus, the present invention furnishes a conveyor roller and bearing arrangement which is designed to cushion and absorb misalignment of the axle 14 and roller 12 and maintain optimum surface contact between the inner and outer bearing races 24, 26 throughout impact loading or preloading. The arrangement further provides a low friction operation, enables dissipation of heat buildup, and allows self-lubrication during operation only as required.

While a particular embodiment of this roller and bearing arrangement has been shown and described, it will be obvious to persons skilled in the art that changes and modifications might be made without departing from the invention in its broader aspects. It is the aim of the dependent claims to cover all such changes and modifications as fall within the true scope and spent of the invention.

What is claimed is:

1. A conveyor roller and bearing arrangement adapted for rotary movement about a stationary axle fixedly secured between spaced, side-support frame rails comprising:
a hollow cylindrical roller having two open ends;
a pair of bearing assemblies mounted in the ends of said roller, each bearing assembly having
a hollow, inner bearing race surrounding and keyed to said axle to prevent rotation about but permit sliding movement along said axle, said inner bearing race having an annular flange lying outside the end of said roller;
a hollow, outer bearing race rotatably mounted on said inner bearing race and having an annular flange positioned radially inwardly of said roller, said flange being provided with a plurality of cooling fins; and
a hollow outer cushioning sleeve secured within the end of said roller and to said outer bearing race, said sleeve being constructed and arranged to maintain axial bearing contact between said inner and outer bearing races upon misalignment of said roller and axle due to uneven loading thereon.

2. A conveyor roller and bearing assembly as defined in claim 1 wherein said outer cushioning sleeve is deformable upon application of loading from said roller.

3. A conveyor roller and bearing arrangement as defined in claim 1 wherein said outer cushioning sleeve is provided with means for driving said roller.

4. A conveyor roller and bearing arrangement as defined in claim 1 wherein said outer cushioning sleeve has an inner surface formed with at least one axially extending, circumferentially spaced passageway.

5. A conveyor roller and bearing arrangement as defined in claim 4 wherein said outer bearing race has an outer cylindrical surface constructed with at least one axially extending, circumferentially spaced rib frictionally engageable with the walls of said passageway.

6. A conveyor and bearing arrangement as defined in claim 5 wherein said outer bearing race is provided with at least one channel extending therethrough so that when assembled, said channel provides communication between said passageway and the interface between said inner and outer bearing races.

7. A conveyor roller and bearing arrangement as defined in claim 6 wherein said passageway provides a reservoir for lubricant to be delivered to said interface.

8. A roller conveyor and bearing arrangement as defined in claim 3 wherein said means for driving said roller includes a groove formed in the outer surface of said outer cushioning sleeve.

9. A roller conveyor and bearing arrangement as defined in claim 3 wherein said means for driving said roller includes a sprocket.

10. A roller conveyor and bearing arrangement as defined in claim 6 wherein said inner and outer bearing races and said outer cushioning sleeve are constructed of polymeric material and said roller is formed of metal.

11. A roller conveyor and bearing arrangement as defined in claim 6 wherein said annular flange on said inner bearing race is engageable at an outer limit defined by said support frame rail and an inner limit defined by the outermost end of said outer bearing race.

12. A conveyor roller and bearing arrangement adapted for rotary movement about a stationary axle fixedly secured between spaced, side-support frame rails comprising:
a hollow cylindrical roller having two open ends;
a pair of bearing assemblies mounted in the ends of said roller, each bearing assembly having
a hollow, inner bearing race of polymeric material surrounding and keyed to said axle to prevent rotation about but permit sliding movement along said axle, said inner bearing race having an annular flange lying outside the end of said roller;
a hollow, outer bearing race of polymeric material rotatably mounted on said inner bearing race and having an annular flange positioned radially inwardly of said roller, said flange being provided with a plurality of cooling fins; and
a hollow outer cushioning sleeve secured within the end of said roller and to said outer bearing race, said sleeve being constructed of polymeric material being deformable upon application of loading from said roller to maintain axial bearing contact between said inner and outer bearing races and providing a reservoir for lubricant to be delivered between said inner and outer bearing races.

13. A conveyor roller and bearing arrangement adapted for rotary movement about a stationary axle fixedly secured between spaced, side-support frame rails comprising:
a hollow cylindrical roller having two open ends;
a pair of bearing assemblies mounted in the ends of said roller, each bearing assembly having
a hollow, inner bearing race of polymeric material surrounding and keyed to said axle to prevent rotation about but permit sliding movement along said axle, said inner bearing race having an annular flange lying outside the end of said roller;
a hollow, outer bearing race of polymeric material having a cylindrical portion rotatably mounted on said inner bearing race and having an annular flange positioned radially inwardly of said roller, said flange being provided with a plurality of cooling fins; and said cylindrical portion having an outer surface formed with spaced ribs, said ribs having channels therethrough; and
a hollow cushioning sleeve secured within the end of said roller and to said outer bearing race and having an inner cylindrical surface formed with spaced passageways including end walls and side walls, said side walls being engageable with said ribs to form a reservoir for lubricant to be delivered through said channels to the interface between said inner and outer bearing rods, said sleeve being constructed of polymeric material being deformable about said end and side walls upon application of loading from said roller to maintain axial bearing contact between said inner and outer races.

* * * * *